Figure 1:
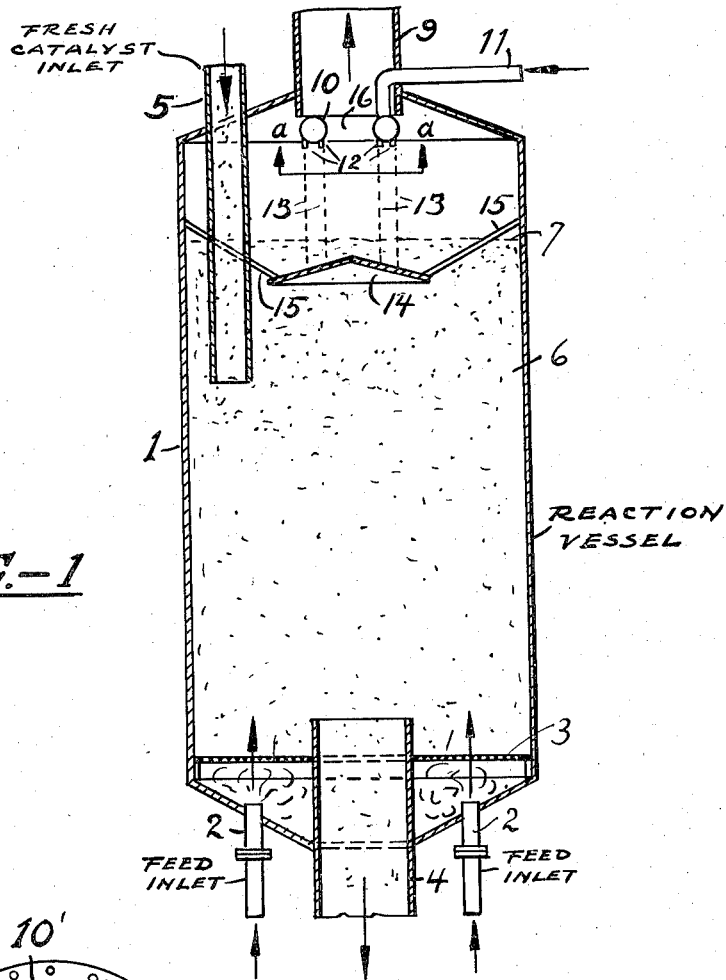

July 3, 1945.  H. Z. MARTIN  2,379,734

TREATMENT OF GASES

Filed Feb. 20, 1943  2 Sheets-Sheet 1

Homer Z. Martin Inventor

By P. L. Young Attorney

July 3, 1945.   H. Z. MARTIN   2,379,734
TREATMENT OF GASES
Filed Feb. 20, 1943   2 Sheets-Sheet 2

Homer Z. Martin Inventor
By ⟨signature⟩ Attorney

Patented July 3, 1945

2,379,734

UNITED STATES PATENT OFFICE 2,379,734

TREATMENT OF GASES

Homer Z. Martin, Cranford, N. J., assignor to Standard Oil Development Company, a corporation of Delaware Application February 20, 1943, Serial No. 476,549

13 Claims. (Cl. 196—52)

This invention relates to a method for the separation of gases from finely divided solid material and is directed more particularly to the separation of catalyst particles from gases in processes in which a circulating mass of catalytic material is employed in a continuous process wherein large quantities of the catalytic material become entrained with moving gases.

In a recently developed apparatus for carrying out process in which gases and solids must be contacted, use is made of a vessel containing the solid in powdered form in a well defined dense bed through which the gases are allowed to flow. By a suitable choice of gas velocity, particle size, density of solid, disengaging height between the dense bed and the outlet of the vessel, etc., it is possible to prevent the entrainment of more than small amounts of the particles in the gas stream leaving the vessel. If any solid material is circulated, say from one vessel to another, the major portion of this circulation is brought about by withdrawing solids from the bottom of the dense phase and introducing the fresh solids at some point below the top of the dense phase. In spite of the relatively low entrainment rate of the solids into the gas stream leaving the upper portion of the vessel as measured in lbs./cu. ft. of gas, for example, because of the scale of operations the amounts of solids which leave with the gas stream are large enough so that for economy of operation they must be recovered, and in the methods which have been proposed to date this recovery at least in its final stages is carried out in equipment located external to the reaction vessel. Certain processes employ a cyclone separator located in the upper portion of the reaction vessel, but even in these cases additional external separating means are required. The present invention comprises a novel method of recovering these solid particles in which no external separating means are required, and the equipment for carrying out this invention which must be located within the reaction vessel is extremely small and involves a very minor expense.

For example, in one of the more recently developed processes for the catalytic cracking of hydrocarbon oils the hydrocarbon feed is brought into contact with a finely divided fluidized mass of catalytic material which is present in sufficiently large quantities to supply most of the heat required in the reaction. The mass of catalyst is continuously withdrawn from the reaction zone and passed to a regenerator where deposited carbonaceous material is burned off, and the catalyst is then recirculated to the reactor. The burning of the carbonaceous deposits produces large amounts of heat which are employed in promoting the cracking reaction.

Such a process may be described in somewhat greater detail as one in which the oil to be cracked is pumped into a cracking zone in the liquid state. Hot, solid contact material in an amount and at a temperature sufficient to vaporize the oil and supply the heat requirements of the cracking process is also charged to the reactor. The oil vapors liberated pass upwardly through an agitated mass of contact material at a relatively low velocity so as to maintain a relatively dense phase of cracking material within the contact zone, while spent contact material is withdrawn from the bottom of this zone. In the usual method of conducting this process the cracking products after leaving the cracking zone are passed to one or more separating devices, such as cyclone separators, and sometimes also a Cottrell precipitator, in order to remove the catalyst which becomes entrained with the exit gases. The products are then passed to conventional fractionating equipment for the segregation of the desired fractions.

The solid contact material is also continuously removed from the cracking zone at the bottom or at some point below the point of exit of the vapors at the top, and passed to a regenerating zone in which the carbonaceous deposits formed on the contact mass are removed by burning in a stream of an oxidizing gas. This oxidizing gas is passed upwardly through the regenerating chamber so that a relatively dense phase of contact material undergoing regeneration is maintained within the regenerating chamber, as was the case in the reaction zone, while the bulk of the solids are continuously withdrawn from the bottom of the vessel. The exit gases from this regenerating zone are also passed through devices for the separation of entrained catalysts in order that most of the catalyst may be recovered and used again in the process. The contact material after being subjected to regeneration is returned to the cracking zone while at or near regeneration temperature so that substantially all of the heat liberated during the regenerating treatment is carried into the cracking chamber.

It is an object of the present invention to provide a simpler and more efficient means for the separation of the catalyst material from the gases which are withdrawn from either the reaction zone or the regenerating zone. The employment of devices such as cyclone separators and Cottrell precipitators involves a large item of expense and considerably increases the complexity of the plant used in the process. By the process of the present invention the entrained solid catalytic material is efficiently removed from the gases before the latter leave the main reaction zone or regeneration zone, as the case may be. No external apparatus is required, and the equipment necessary to be inserted in the reaction or regeneration zones is extremely simple and inexpensive.

In accordance with the present invention the exit gases from the various zones in which the gases become admixed with finely divided solid material are freed from such material at or near the point of exit by providing a dense shower of liquid through which such gases must pass before they are liberated. It will be understood that in the above described catalytic cracking process the incoming hydrocarbon oil or gas feed in the reaction zone and oxidizing gas in the regenerating zone pass upwardly through a relatively dense phase of finely divided catalyst which is maintained in a fluidized condition by the upward movement of such gases, and that there is within the zone of activity a more or less definitely defined upper surface of such dense phase, above which the gases collect preparatory to being removed from the vessel, the gases containing in suspension considerable quantities of the powdered catalyst. The gases move at such a velocity and the catalyst is so finely divided that a considerable fraction of such catalyst is normally removed from the vessel unless special means are provided for causing complete separation within the vessel.

In a preferred method of carrying out the present invention an opening is provided in the top of the vessel containing catalyst and upward moving gases, and such opening is surrounded by a series of jets or other outlets through which a suitable liquid is forced, whereby there is produced a fairly dense shower or curtain of falling liquid which completely surrounds the opening provided for the exit of the gases. A protecting shield or baffle is provided to prevent the gases from passing directly into the opening without passing through the shower. The particles of the entrained solid are thrown downward into the vessel by the impact of the falling particles of liquid. If a sufficient amount of the spraying liquid is used, a portion of the liquid may also serve to cool the gases substantially so that other portions of the liquid will have less tendency to evaporate while functioning as a scrubbing medium. In cases where the gases are removed at a considerable velocity and where one series of jets does not provide a sufficiently dense shower to separate all of the solids, a second and perhaps a third series concentric with the first may be provided for removing the last traces of solid material. The use of two or more series of jets is also advantageous in providing for cooling of the gases prior to their contact with further liquid sprays.

In operations such as the catalytic cracking processes described above the solids and gases within the reaction or regenerating zones will be at quite high temperatures, namely, of the order of 800–1000° F. In such cases the liquid normally to be used in the creation of the shower or spray within the vessel, such as hydrocarbon oils or water, may become vaporized in an extremely short time after entering the vessel. It will therefore be desirable to project the liquid into the vessel at a quite high velocity and at a temperature well below its boiling point, in order that an effective liquid shower may be provided. In the cracking process in which a relatively dense phase of fluidized mass exists in the lower part of the vessel, it is necessary to provide a sufficient velocity to the liquid so that the liquid particles will not become completely vaporized before reaching the upper surface of this dense catalyst phase.

With regard to the specific materials which may be employed as suitable liquids for separation of solids from the gases, the choice will depend upon availability, the effect which the material after vaporization will have upon the exit gases and upon the catalyst present, and the feasibility of introducing the same into the vessel under the prevailing temperature conditions. In the catalytic processes described a suitable material for use in separating the cracked products from the catalyst in the reaction zone is recycled heavy oil or recycled dilute heavy oil catalyst slurry. The heavy oil could be taken from the bottom of the fractionator in which the cracked products are separated. A slurry would be formed as bottoms if the scrubber in the reactor was not 100% efficient, and this slurry could be used as the spraying liquid. A lighter oil could be used, and it would recycle from the reactor to the fractionator and back to the spraying device. Water could also be used as the spraying liquid in the reactor. Diphenyl, a liquid boiling at about 700° F., would also be suitable, and could be recirculated through the system as in the case of a recycle oil. When the catalyst separation is to occur in the regenerating zone a very suitable liquid for the purpose is water. When using a heavy mineral oil as the screening liquid in accordance with the present invention and in a zone in which the temperature is of the order of 1000° F. or higher, it will be necessary to provide a velocity of at least 25 to 100 feet per second, or higher, and when water is similarly used in an environment having such temperatures similar velocities should be employed. When water is used for spraying in either vessel, about one pound may advantageously be used per pound of catalyst recovered. Substantially larger quantities of a more volatile liquid should be used.

It will be understood that the method of the present invention is not limited to an application in the catalytic cracking field, but may be employed wherever it is desired to separate gases from entrained or suspended solid material and is especially useful where the separation must occur at high temperatures. Among other operations in which the method may be advantageously applied are hydroforming processes, gas absorption processes, naphtha retreating processes, shale distillation, coal carbonization, lime burning, catalytic chlorine production processes, and in general any operation in which a solid catalyst is entrained with outgoing gases.

Figure 2:
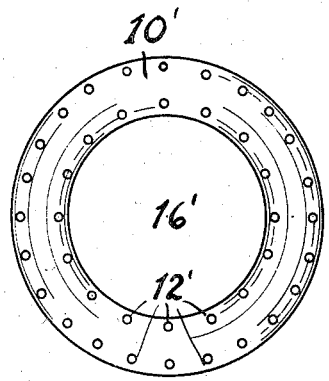
Figure 4:
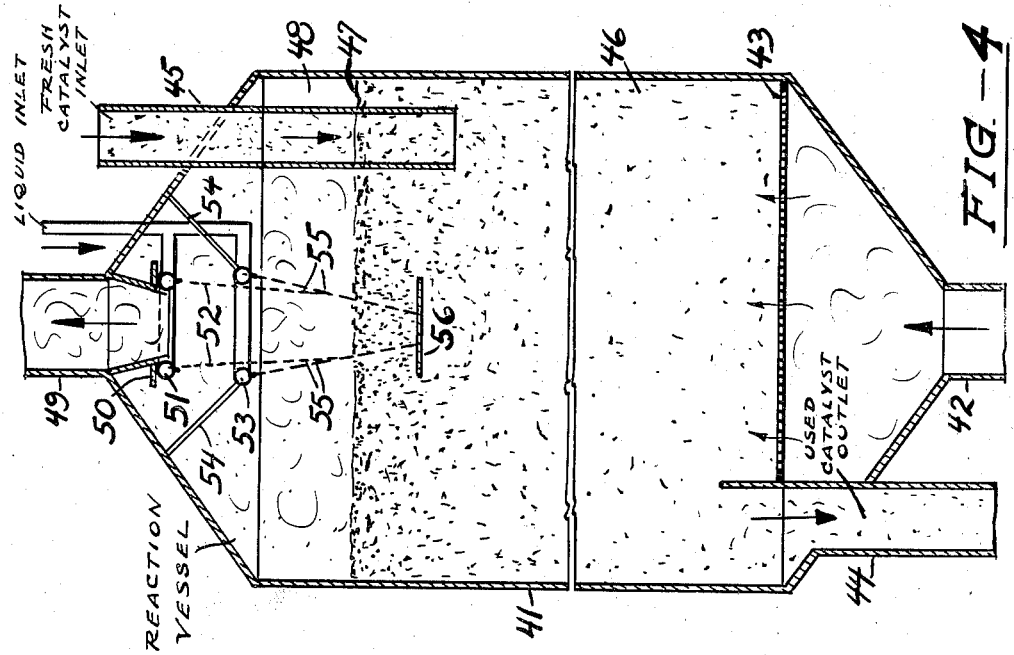
Figure 3:
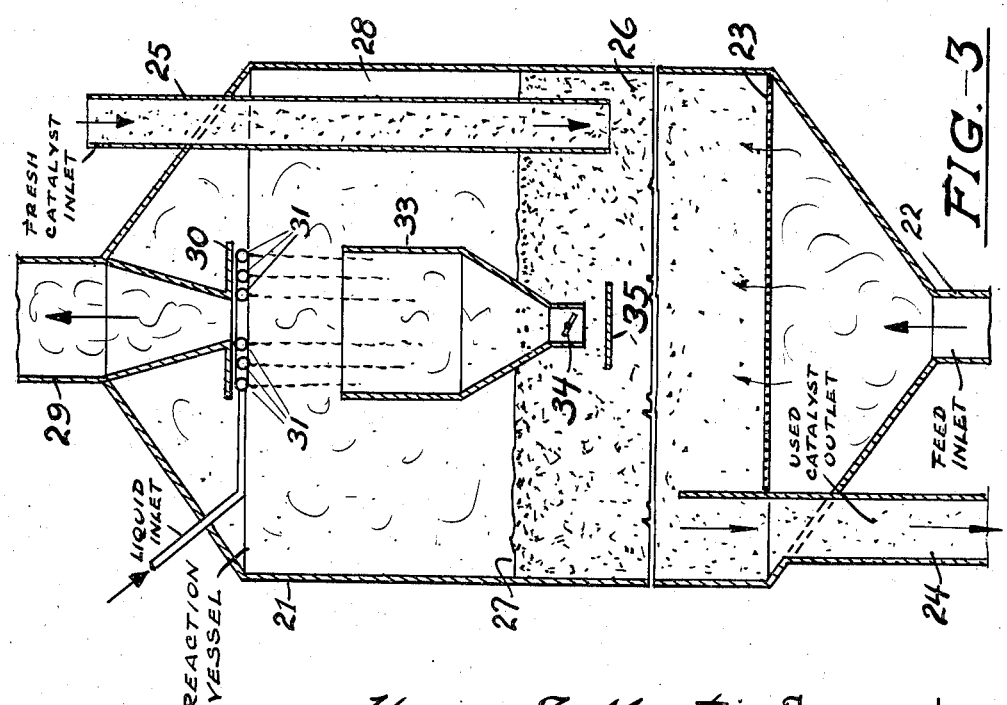

Preferred embodiments of the present invention will now be described in connection with the accompanying drawings. Figure 1 shows an elevational sectional view of a reaction vessel containing a fluidized mass of solid catalytic material, with provision for the entrance of feed material at the bottom and the exit of gaseous products from the top, while spent catalyst is continuously drawn off through the bottom. A device is provided in accordance with the present invention for producing two concentric circular showers of liquid which surround the opening provided for the exit of the gaseous products. Figure 2 is an enlarged plan view of the section taken at line a—a of Figure 1. This shows the arrangement of the jets surrounding the opening for the exit gases. Figures 3 and 4 show modifications of the apparatus shown in Figure 1.

Referring to Figure 1 of the drawings, hydrocarbon feed, preferably in the form of a gas, enters vessel 1 through inlets 2 and passes through screen 3 into the body of fluidized catalyst mass occupying the greater portion of the interior of the vessel. Used catalyst is continuously withdrawn through exit pipe 4 at the bottom, while fresh catalyst is introduced by any means near the top of the vessel, such as pipe 5. Incoming feed passes upward through the vessel at such a velocity as to maintain the fluidized condition. The mass of the catalyst is contained within the dense phase 6 which terminates at an upper surface 7, above which the products in the form of vapor collect with considerable amounts of entrained or suspended catalyst in space 8 before leaving the vessel by exit stack 9. At or near the bottom of stack 9 is provided an annular container or conduit 10 surrounding the opening through which the gases must pass. Container 10 is adapted to receive and contain a liquid under considerable pressure, such liquid being introduced through line 11. At the bottom of container 10 are provided two concentric series of jets 12 which connect with the interior of the same and are adapted to release liquid from the container in the form of fine streams 13 which in falling commingle with one another and form a dense shower of falling liquid. The two series of jets thus form two such curtains of liquid through which the exit gases must pass. A baffle 14 is provided at or slightly below the upper surface 7 of the dense phase of catalyst and directly underneath jets 12, in order that the liquid shower will not affect conditions within the interior of the catalyst mass. Baffle 14 may be suspended by any convenient means, such as rods 15. After passing through the two showers of liquid the exit gases may then escape from the vessel through opening 16.

In Figure 2, which is an enlarged plan view of the section taken at a—a of Figure 1, 10' represents the bottom surface of container 10, around the outer and inner edges of which are provided two closely spaced series of jets 12'. 16' represents the opening through which the washed gases pass to the exterior.

Figure 3 of the drawings illustrates a modification of the apparatus shown in Figure 1. In Figure 3 the hydrocarbon feed vapors enter vessel 21 through inlet 22 and pass through screen 23 into the body of fluidized catalyst mass in the interior of the vessel. The used catalyst is continuously withdrawn through exit pipe 24 at the bottom while fresh catalyst is introduced by any means through the top of the vessel by means of pipe 25. The mass of the catalyst is contained within the dense phase 26 which terminates at an upper surface 27, above which the products in the form of vapor collect with considerable amounts of entrained or suspended catalyst in space 28 before leaving the vessel by exit stack 29. This exit stack is preferably narrowed at its lower end, where it is surrounded by an annular member 30 which supports a concentric series of circular conduits 31, which are provided with openings or jets adapted to project vertically downward a spray of liquid which enters conduits 31 by any convenient means. Projecting upward in the interior of the vessel is a cylindrical receiver 33 which is positioned to receive the liquid being projected downward in the form of a shower, space being allowed above the upper end of receiver 33 to provide for the escape of gases through the shower. Receiver 33 is narrowed at its lower end and extends into the dense phase of catalyst. A damper 34 may be provided to control the flow of materials through the lower end of receiver 33. A baffle 35 may also be provided at a point directly beneath the opening from receiver 33. This modification of the invention permits decreasing the vertical distance through which the spray must persist. It thus becomes unnecessary to design the spray to operate through the complete distance from the outlet pipe to the top of the dense bed, which is often 10 to 15 feet. This modification is especially useful when the more volatile liquids are used in high temperature equipment.

Figure 4 of the drawings illustrates a still further modification of the type of apparatus shown in Figure 1. In this figure hydrocarbon feed enters the vessel 41 through inlet 42 and passes through screen 43 into the interior of the vessel, where used catalyst is continuously withdrawn through exit pipe 44 at the bottom and fresh catalyst is introduced through pipe 45, which extends from the top of the vessel to a point within the dense phase of the catalyst 46. This dense phase may be considered as terminated by surface 47, above which the gaseous products collect with entrained catalyst and then tend to escape through exit pipe 49. Surrounding the lower end of pipe 49, which is preferably restricted in diameter, is an annular member which supports an annular conduit 51 provided with openings or jets which project a shower of liquid downward from points surrounding the lower end of pipe 49. Situated in a position substantially directly below conduit 51, but at a substantial distance therefrom, is a second annular conduit 53, supported by members 54, which is also adapted to project downward a shower of scrubbing liquid, conduit 53 being so positioned and the openings or jets so arranged that the shower of liquid proceeding from conduit 51 meets and commingles with the shower produced from conduit 53. There may be, if desired, more than two such conduits in the vertically arranged series, providing a funnel of showering liquid extending from the lower end of stack 49 to the upper surface of the dense phase of catalyst. If desired, a baffle 56 may be provided at a point somewhat below the upper surface of the dense phase to scatter the showering liquid after it reaches the catalyst.

It will be understood that in the process described above various modifications in detail may be made without affecting the principle of the invention, such as the introduction of the hydrocarbon feed into the reaction zone in the form of a liquid, which is vaporized within the reaction zone itself.

It will also be understood that the above described apparatus will be quite suitable for an installation not only in the reaction zone of a catalytic process, but also in the catalyst regenerator used in such process, and in other apparatus from which gases tend to escape with entrained solids.

The present invention is not to be considered as limited by any of the examples thereof, which are described herein for illustration purposes only, but solely by the terms of the appended claims.

I claim:

1. In a process of removing gases from a hot zone in which such gases are moved upward through a dense phase consisting of a finely divided fluidized mass of solid material, then through a less dense phase consisting of gases with entrained solid material, and finally out of the zone at the top thereof, the method of preventing removal of entrained solid material with the gases which comprises causing the gases to pass through a downward moving shower of liquid, the said liquid entering the hot zone at a temperature substantially lower than its boiling point and projected into said zone at a velocity sufficient to cause the same to reach the said dense phase of fluidized material before becoming completely vaporized.

2. A process according to claim 1 in which the gases leave the said zone through an opening in the top thereof and in which the said shower of liquid is produced by passing the liquid downward from a series of outlets surrounding said opening.

3. Process according to claim 1 in which the said shower of liquid is produced by passing the liquid through a plurality of concentric series of outlets surrounding the opening at the top of the zone through which the said gases escape.

4. Process according to claim 1 in which the said hot zone is a unit in a catalytic cracking apparatus, said unit containing a fluidized mass of catalytic material.

5. A process according to claim 1 in which the said hot zone is the reaction zone of a catalytic cracking process and contains a fluidized mass of catalytic material, in which the escaping gases consist of cracked hydrocarbon products, in which the material used to form the liquid shower is a hydrocarbon oil, and in which the temperature in the reaction zone is at least as high as 800–1000° F.

6. A process according to claim 1 in which the said hot zone is the reaction zone of the catalytic cracking process and contains the fluidized mass of catalytic material, in which the escaping gases consist of cracked hydrocarbon products, in which the material used to form the liquid shower is water, and in which the temperature is at least as high as 800–1000° F.

7. A process according to claim 1 in which said hot zone is the catalyst regenerating zone of a catalytic cracking process and contains a fluidized mass of catalytic material being regenerated by an incoming oxidizing gas, in which the escaping gases consist of products of combustion of carbonaceous material and any unused oxidizing gas, in which the material used to form the liquid shower is water, and in which the temperature is at least as high as 1000° F.

8. A process according to claim 1 in which the gases leave the said zone through an opening in the top thereof and in which the said shower of liquid is produced by passing the liquid downward from a series of outlets surrounding said opening, and in which the shower of liquid passes into an open receiver which is narrowed at its lower end and extends into the dense phase of catalyst and opens into said dense phase, sufficient space being provided between the upper end of said receiver and the outlets from which the liquid shower proceeds to allow escape of gases in the upper portion of the zone through the liquid shower.

9. A process according to claim 1 in which the gases leave the said zone through an opening in the top thereof and in which the said liquid shower is produced by passing the liquid downward from a series of outlet surrounding said opening and from at least one additional series of outlets positioned below the first series of outlets, the liquid showers from the various series of outlets being so directed that the shower proceeding from an upper series of outlets meets and commingles with the shower proceeding from the next lower series of outlets, the shower from the lowest series of outlets having a velocity sufficient to cause the same to reach the dense phase of fluidized material before becoming completely vaporized.

10. In a process of removing gases from a hot zone in which such gases are moved upwardly through a dense phase consisting of a finely divided fluidized mass of solid material, then through a less dense phase consisting of gases with entrained solid material, and finally out of the zone at or near the top thereof, the method of preventing the removal of entrained solid material with the gases which comprises causing the outgoing gases to pass through a series of downwardly moving showers of liquid directed toward the said dense phase of fluidized solid material, the amount of liquid used in forming the shower or showers with which the hot gases first come into contact being sufficient to cool the gases to such a degree that contact of the same, during their further course toward the exit, with an additional shower or showers will not cause the liquid of such showers to vaporize sufficiently to prevent a substantial amount of such liquid from reaching the said dense phase of fluidized solid material and effectively removing the entrained material from the outgoing gases.

11. A method according to claim 10 in which the said showers of liquid are produced by passing the liquid through a plurality of concentric series of outlets surrounding an opening at the top of the hot zone through which the gases escape.

12. A method according to claim 10 applied to a unit of a catalytic cracking apparatus in which the fluidized mass is a mass of finely divided catalytic material and in which the velocity of the upwardly moving gases is sufficient to maintain a fluidized condition throughout the catalyst mass but not sufficient to prevent continuous removal of a portion of the catalyst from the hot zone by means of an outlet at or near the bottom thereof.

13. A method according to claim 10 in which the liquid composing the showers is water.

HOMER Z. MARTIN.